(12) United States Patent
Chomiakow et al.

(10) Patent No.: US 6,268,465 B1
(45) Date of Patent: Jul. 31, 2001

(54) HYDROLYSIS-RESISTANT ALIPHATIC POLYESTER AMIDES, THEIR PRODUCTION AND USE

(75) Inventors: Gudrun Chomiakow, Ludwigshafen; Hasan Ulubay, Dannstadt; Emil Wilding, Birkenheide, all of (DE)

(73) Assignee: BK Giulini Chemie GmbH Co OHG, Ludwigshafen (DE)

( * ) Notice: Subject to any disclaimer, the term of this patent is extended or adjusted under 35 U.S.C. 154(b) by 0 days.

(21) Appl. No.: 09/091,306

(22) PCT Filed: Dec. 11, 1996

(86) PCT No.: PCT/EP96/05533

§ 371 Date: Apr. 12, 1999

§ 102(e) Date: Apr. 12, 1999

(87) PCT Pub. No.: WO97/21759

PCT Pub. Date: Jun. 19, 1997

(30) Foreign Application Priority Data

Dec. 14, 1995 (DE) .............................. 195 46 657

(51) Int. Cl.[7] .................................................. C08G 69/44
(52) U.S. Cl. ................... 528/310; 528/170; 528/172; 528/173; 528/179; 528/183; 528/188; 528/220; 528/229; 528/272; 528/274; 528/283; 528/287; 528/312; 528/313; 528/316; 528/322; 528/355; 528/336; 528/337; 525/437; 525/450; 156/325; 156/326; 156/327; 156/332
(58) Field of Search .................... 528/179, 183, 528/170.188, 172, 173, 229, 220, 272, 274, 310, 283, 287, 312, 313, 316, 322, 336, 335, 337; 156/325–327, 332; 525/437, 450

(56) References Cited

U.S. PATENT DOCUMENTS 3,380,840   4/1968  Harrison ................. 106/243
5,310,827 * 5/1994  Komiya et al. .......... 525/439

FOREIGN PATENT DOCUMENTS

| 896113 | 5/1945 | (DE) . | |
| 2913460 | 10/1980 | (DE) . | |
| 0102115 | 3/1984 | (EP) . | |
| 0159053 | 10/1985 | (EP) . | |
| 0323700 A2 | 7/1989 | (EP) | C08G/18/42 |
| 0448079 A2 | 9/1991 | (EP) | C08G/63/16 |
| 0449534 A2 | 8/1992 | (EP) | C08G/63/16 |
| 0572256 A2 | 12/1993 | (EP) | C08G/63/91 |
| 1214177 | 4/1960 | (FR) . | |
| 858757 | 1/1961 | (GB) . | |

OTHER PUBLICATIONS

Yamazaki, N., et al., "Studies on Reactions . . . ", *J. of Polym. Science*, vol. 13, (1975), pp. 1373–1380.

* cited by examiner

*Primary Examiner*—P. Hampton-Hightower
(74) *Attorney, Agent, or Firm*—Venable; George H. Spencer; Ashley J. Wells

(57) ABSTRACT

An aliphatic polyester amide which is hydrolysis-resistant includes a ternary polycondensation product of monomeric constituents composed of a monomeric constituent A which is at least one diol having a general formula: HO—$R_1$—OH, where $R_1$ is an aliphatic residue having 2–16 carbon atoms; a monomeric constituent B which is at least one dicarboxylic acid having a general formula: HOOC—$R_2$—COOH, where $R_2$ is an aliphatic residue having 1–14 carbon atoms; and a monomeric constituent C which is at least one diamine having a general formula: $H_2N$—$R_3$—$NH_2$, where $R_3$ is an aliphatic residue having 2–16 carbon atoms and is present in an amount of up to about 5% by weight based on total weight of the monomeric constituents, wherein polycondensation proceeds in the presence of a catalyst comprised of constituent D, which is a metal-containing catalyst, in combination with constituent E, which is at least one of an organic phosphorus compound and an inorganic phosphorus compound, and wherein the ternary polycondensation product is subsequently treated with constituent F, a multivalent isocyanate compound, at a temperature reduced to about 150° C. or less for a maximum of 10 minutes so that the aliphatic polyester amide has chain terminations which are partially isocyanate-terminated and so that the ternary polycondensation product has a viscosity of at least 50,000 cPs as measured by an automatic Ubbelohde Viskosimeter in xylene at 25° C.

18 Claims, No Drawings

HYDROLYSIS-RESISTANT ALIPHATIC POLYESTER AMIDES, THEIR PRODUCTION AND USE

BACKGROUND OF THE INVENTION

1. Field of the Invention

The present invention concerns new, hydrolysis-resistant polyester amides with a high molecular weight and partially isocyanate-terminated chains, their production and use, in particular for producing shoe reinforcing materials.

2. Description of the Related Art

The production of polyester urethane films, which serve as self-sticking reinforcing materials and are formed through reaction of polyester chains with isocyanates, is known from the EP-0 323 700 A2 (1). The ratio of isocyanate groups to hydroxyl groups is given at 0.75 to 1.1, preferably 0.9. According to example 1, the material is produced as follows:

Polytetramethylene adipate with a hydroxyl value of 40–45 and an acid value of 0.1–0.7 is heated with 0.003% by weight phosphoric acid and is allowed to react with 7.79% by weight of liquid diisocyanate at 85° C. The resulting product is then extruded into a film, is coated on both sides with a cotton fabric and can be used in this way as shoe reinforcing material, in particular as heel and toe cap material. It has the following characteristics: at 60–125° C., the material is not crystalline, soft and moldable (claim 2). The material is white and crystalline after being heated up to 85° C. and allowed to cool for about 12 minutes. The physical properties of this material are not completely known. Chemically, this is a polyester urethane, which by definition is a compound having urethane groups inserted into the polymer chain.

A high-molecular polyhexamethylene adipate and a method for producing it are described in the EP-0 448 079 A2 (2). In contrast to the material and method described in (1), said material has the desired high molecular weight without the addition of isocyanates. Both polymeric materials are used for the same purpose, namely to replace CAPA™ or polycaprolacton; see page 3, line 29 ff. The high molecular weight or the high viscosity of at least 300 cPs is realized in (2) in that the molar ratio of diol/acid is within the range of 0.99–1.03 and that a slight excess of diol is used in particular at a molar ratio of 1.001 to 1.01. The production method is a simple polycondensation at temperatures below 223° C., wherein standard catalysts are used for this.

Another high-molecular polytetramethylene and/or polypentamethylene adipate, and possibly also a polyhexamethylene adipate, are described in the EP-0 499 534 A2 (3). The desired high molecular weight should be at least 10,000, which by the way also corresponds to the weight in (2). The subject-matter in (3) is a polymeric hot-melt adhesive which is to replace the polycaprolacton in the same area of use. In reference (3) no isocyanates are used, and the high molecular weight is realized through a slight excess of diol. Otherwise, both methods are nearly identical, except for the respective charge materials.

The EP-0 572 256 A2 (4) discloses the production of biodegradable, high-molecular aliphatic polyesters. In order to stabilize the polyesters, phosphoric acid or phosphoric acid esters are forcibly added. The polyesters are produced from an aliphatic or alicyclic glycol through esterification with an aliphatic dicarboxylic acid. Following the polyester formation, the phosphoric acid compound and the polyfunctional isocyanate compound are added for the cross-linking. In this way, it is achieved that the final product is biodegradable and high-molecular, but at the same time resistant to thermal decomposition. The final product produced in this way is used in the form of films or foams or in molded parts, primarily for the manufacture of vehicles.

The production of polyester amides through random and block polymerization is furthermore known from the Journal of Applied Polymer Science, 1809–1822 (1982) (5), wherein diols, e.g. decanols, are converted together with adipic acid dichloride and a diamine. Approximately equal parts of all components are used.

The above-mentioned polymeric hot-melting adhesives, however, do not yet have the required bifunctional properties for use as a shoe reinforcing material. Such properties include: a high hydrolysis resistance, paired with a good processability, e.g. in the powder coating technology.

The hydrolysis resistance during the period of use is a very important property as these materials are constantly exposed to moisture. Since the material must be processed within a narrow temperature range of 50 to 80° C., its melting and also its mechanical properties in the crystallized state must be correspondingly optimal.

Above all, it was the object of the present invention to develop hydrolysis-resistant hot-melting adhesive systems on a polyester base, which can be used in particular for the production of shoe reinforcing materials, especially materials with a bifunctional use, namely as a hot-melting adhesives for gluing at temperatures of approximately 50 to 80° C. and also as reinforcing materials.

SUMMARY OF THE INVENTION

The solution was with a hydrolysis-resistant polyester amide with high molecular weight and partially isocyanate-terminated chains, which can be obtained from the following monomers through a ternary polycondensation:

a) Diols with the general formula:

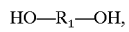

$$HO-R_1-OH,$$

wherein $R_1$ is an aliphatic residue with 2–16, preferably 4–12, carbon atoms (component a).

b) Dicarboxylic acids with the general formula:

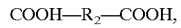

$$COOH-R_2-COOH,$$

wherein $R_2$ is an aliphatic residue with 1–14, preferably 2–8, carbon atoms (component b).

c) Diamines with the general formula:

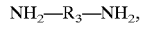

$$NH_2-R_3-NH_2,$$

wherein $R_3$ is an aliphatic residue with 2–16, preferably 4–8 carbon atoms (component c) and is used in amounts up to 5% by weight, as referred to the sum of the chain-forming components, wherein a catalyst (component d) and an organic and/or inorganic phosphorus compound (component e) are used during the polycondensation, and the resulting polymer with an average molecular weight of >30,000 D has a constant linear structure and high crystallinity, is made to react briefly with a multivalent isocyanate (component f) and the polyester amide obtained in this way has a viscosity of at least 50,000 cPs. The properties of the polyester amides according to the invention are determined on the one hand by the production method and, on the other hand, by the selection of monomers, stabilizers and catalysts.

The materials 1.4-butane diol or 1.6 hexane diol in particular are considered as components a. Adipic acid is the preferred component b, with which the diols react best.

Hexamethylene diamine is primarily used as component c. The system of catalysts, composed of organic or inorganic tin compounds, particularly tin(II)oxide in connection with phosphoric (P(III)) compounds, in this case tin(II)phosphite, ensures minimal side reactions and the structuring of a high-molecular weight (approximately 40,000) with strong linear structure and high crystallinity. When adding small amounts of diisocyanate, these are added to the polymer skeleton and are thus immobilized, resulting in an increased stability during use, e.g. with skin-contact moisture, without increasing the molecular weight and the viscosity. It is particularly important here to stress that the isocyanate groups are present only at the end of the polymer chain and are not inserted. The addition of a small amount of hexamethylene diisocyanate (component f) causes the protons that catalyze the hydrolysis to be intercepted under moist conditions. Otherwise, the cleavage (hydrolysis) of the ester groups, which is typical for normal polyesters, would then occur and lead to a rapid decomposition of the chains and a worsening of the mechanical characteristics.

The hydrolysis stability in this case can therefore be described as chemical resistance to the effects of moisture and an acidic environment. The progress of the hydrolysis, meaning the cleavage of the long polymer chains, can be recognized on the changes in the physical properties. Existing short chains or short chains formed through hydrolysis cause an increase in the breaking tendency, up to the behavior of glass and wax, with a simultaneous drop in the melting viscosity.

The strictly linear structure is realized through the specific selection of the monomers. That is why it is important to select monomers having an even number of carbon atoms. The polyester structure can be correlated directly with the recrystallization time. With the two-stage process as described below, a strong linear block structure develops, thereby resulting in a high order and thus also a shorter recrystallization time. However, if a one-stage process is used, a so-called random structure forms with a random arrangement of polymer chains, which consequently increases the recrystallization time.

The production of polyester amides occurs in one or two stages. This refers to the point in time when the amine components are added: immediately at the start of the process (1-stage), or after reaching a polymerization degree of 6–14 through components a and b (2-stage). At the beginning, the components a, b and if necessary also c are melted carefully under the influence of inert gas and stirring, and the catalyst (components d and e) is added. Organic and/or inorganic tin compounds in combination with phosphoric acid and/or its esters or metal phosphite can be used as catalysts. In order to avoid decomposition reactions of the polyester, this takes place in a weakly acidic environment.

This melt is esterified for approximately 1 hour at 100–110° C. and subsequently is gradually heated up with simultaneous, continuous removal through distilling of the reaction water (melt polycondensation, if necessary with entrainers and azeotropic distillation of the reaction water). Prior to using the vacuum, an effective amount of an interesterification catalyst known from the state of the technology, e.g. a titanic acid ester, is added. Subsequently, the component f, e.g. hexamethylene diisocyanate is added while the mixture is stirred continuously and is brought to reaction for about 5–10 minutes. The polyester amide is obtained in the form of a hot, highly viscous melt, which changes to a rope-like form after being poured into cold water. Following the granulating and grinding, such a solid product can be used in the form of a powder, for example, in powder coating machines.

Determination of Product Characteristics

A DSC device by the Mettler Company, DSC 12 E, was used to measure the melting temperature as well as the recrystallization time. The limiting viscosity numbers were determined with the aid of an automatic Ubbelohde Viskosimeter in xylene at 25° C. The "discharge" was determined manually and evaluated on a scale of 1 . . . 10 (1—plastic; 10—ideally elastic).

Test of the Hydrolysis Resistance

Films with a thickness of approximately 0.5 mm were rolled from the products in examples 1–7 and the comparative examples 1 and 2, which films were stored in a climatic chamber under the following conditions:

temperature 50° C.

relative humidity 85%

The decrease in the fracture strength of the films was checked at regular intervals in that the film is bent at an angle of 180° and the bending location is checked. The time (in days) to the first fatigue failure was viewed as relative measure of the hydrolysis resistance.

DESCRIPTION OF THE PREFERRED EMBODIMENTS

The following examples are designed to illustrate the invention further.

EXAMPLE 1

168 g adipic acid and 136.5 g 1.6-hexane diol are poured into a 500 ml round-bottom flask and nitrogen is superimposed. The mixture is melted carefully by stirring it and 0.25 g tin-II-phosphite (catalyst) is added. This is allowed to undergo reaction for approximately 1 hour at 100–110° C., and the temperature is increased over a 10-hour period to 210° C., whereby the resulting reaction water is constantly distilled off. After reaching a temperature of approximately 200° C., the pressure is also reduced gradually (to 0.5 mbar). The product viscosity increases noticeably (visco-agitator!) after approximately 9 hours. The stirring continues for another 4 hours until a constantly high viscosity (100–150 cPs) is reached. The temperature is then reduced to about 150° C., the vacuum with nitrogen is broken and 1.1 g hexamethylene diisocyanate is added by dripping it in. The stirring continues for another 2–3 minutes, wherein no further increase in the viscosity is observed. Following this, the product with a temperature of approximately 120° is poured into the cold water and thus is given the rope-like shape. The acid value <0.3 mg KOH/g. Characteristics: see table.

EXAMPLE 2

Part I 25 kg adipic acid are stirred into 16.18 kg of 1.4 butane diol as a slurry. A mixing catalyst is added (20:80 mixture of tin-II-oxide and tin-II-phosphite) and the reaction vat is washed with nitrogen. The mixture is heated to 110° C. and stirred for 1.5 hours. Subsequently, the temperature is raised over a 10-hour period to 200° C. while the reaction water is distilled off. Later, the pressure is reduced to approximately 400 mbar and a small amount of butane diol is distilled. After approximately 1 hour, a white, wax-like intermediate product with the acid number=56–64 mg KOH/g is obtained.

Part 2/1 (According to the Invention)

In a stirring flask, 6 g of 1.6 diaminohexane is added to 300 g of the intermediate product from part 1, and this mixture is condensed under strongly reduced pressure (0.5–1 mbar) at 210° C. After 12 hours, a highly viscous polyester amide with SZ<0.5 is obtained, to which is then added 0.5 g HMDI at 120° and this is poured out after 3 minutes to form a rope-like product. Characteristics: see table 1.

Part 2/2 (Not According to the Invention)

In a stirring flask, 0.06 g of tetraisopropyl orthotitanate are added to 300 g of the intermediate product from part I and the mixture is poly-condensated under reduced pressure (approximately 1 mbar) at 210–215° C. After 5 hours, a viscous polyester with SZ<1.5 is obtained, to which 1.5 g HMDI are added subsequently at 120° C. The stirring continues for another 20 minutes, wherein a noticeable increase in the viscosity occurs.

EXAMPLES 3–7

Additional products were produced according to the diagram in examples 1 and 2. The exact conditions are listed in table 1.

Comparison Example 1

A polyester according to the European Patent Application EP-O 448 079 A1 was produced from adipic acid and hexane diol.

Comparison Example 2

A polyester according to the example 3 in the European Patent Application EP-O 569 149 A1 was produced from adipic acid, succinic acid and butane diol.

Comparison Example 3

10.8 9 hexamethylene diisocyanate were added at 85° C. to 180 g of commercially available polyester diol with a hydroxyl number 44 in a container for stirring, equipped with a visco-agitator (analogous EP 323 700). After approximately 30 minutes, a strong increase in the viscosity occurred. The content was stirred for another approximately 2 hours, until a constant melting viscosity could be determined. The product was then poured into cold water to form a rope-like products.

Reaction Conditions

| Ex. No. | AdS g | DS g | BD g | HD g | DAH | DAO | HMDI g | Sn [%] | TPT g | ArbA. | reac time |
|---|---|---|---|---|---|---|---|---|---|---|---|
| 1 | 168.0 | 0.0 | 0.0 | 136.5 | 0.0 | 0.0 | 1.10 | 0.041 | 0.00 | | 24 |
| 2/1 | 192.9 | 0.0 | 124.8 | 0.0 | 7.9 | 0.0 | 0.82 | 0.036 | 0.02 | 2-st. | 23 |
| 2/2 | 192.9 | 0.0 | 124.8 | 0.0 | 0.0 | 0.0 | 1.20 | 0.036 | 0.05 | | 22 |
| 3 | 146.2 | 0.0 | 44.1 | 59.1 | 6.0 | 0.0 | 0.52 | 0.053 | 0.00 | 1-st. | 28 |
| 4 | 0.0 | 230.4 | 0.0 | 115.7 | 0.0 | 4.3 | 0.66 | 0.001 | 0.03 | 1-st. | 29 |
| 6 | 146.2 | 0.0 | 94.6 | 0.0 | 0.0 | 4.3 | 0.41 | 0.025 | 0.00 | 2-st. | 23 |
| 7 | 146.2 | 0.0 | 0.0 | 116.9 | 6.0 | 0.0 | 0.95 | 0.040 | 0.00 | 2-st. | 20 |
| Co. 1 | 207.9 | 0.0 | 0.0 | 168.9 | 0.0 | 0.0 | 0.00 | 0.005 | 0.08 | | 23 |
| Co. 2 | 25.0 | 198*) | 177.0 | 0.0 | 0.0 | 0.0 | 4.66 | 0.000 | 0.02 | | 15 |
| Co. 3 | — | — | — | — | — | — | 10.8 | — | | | 3 |

Product Characteristics

| Ex. No. | Melting temp. | [$\mu$] | rec. time | discharge | Hydrol. res. |
|---|---|---|---|---|---|
| 1 | 62 | 0.56 | 9 | 9 | 278 |
| 2/1 | 60 | 0.49 | 17 | 7 | 259 |
| 2/2 | 59 | 0.53 | 11 | 8 | 189 |
| 3 | 61 | 0.55 | 24 | 5 | 233 |
| 4 | 68 | 0.89 | 18 | 8 | 297 |
| 6 | 61 | 0.47 | 15 | 7 | 263 |
| 7 | 61 | 0.53 | 11 | 8 | 277 |
| Comp. 1 | 62 | 0.56 | 8 | 9 | 177 |
| Comp. 2 | 101 | 0.71 | 16 | 8 | 146 |
| Comp. 3 | 58 | 0.49 | 18 | 4 | 128 |

Abbreviations Used in the Tables:

| | |
|---|---|
| AdS | adipic acid |
| DS | dodecanedioic acid |
| BD | 1.4 butane diol |
| HD | 1.6 hexane diol |
| DAH | 1.6 diaminohexane |
| DAO | 1.8 diamino octane |
| HMDI | hexamethylene diisocyanate |
| Sn | tin catalyst (% Sn) |
| TPT | tetraisopropyltitanate |
| Arw. | method for adding the amine component |
| Reak.z | reaction time in hours (total) |
| Fp | melting temperature |
| [$\mu$] | limiting viscosity |
| Rekrist.z. | recrystallization time in min/40° C. |
| Ausfall [breakdown] | interaction of strength and elasticity of 1:10 |
| Hbst | hydrolysis resistance |

What is claimed is:

1. An aliphatic polyester amide which is hydrolysis-resistant, comprising:
   a ternary polycondensation product of monomeric constituents comprised of:
   a monomeric constituent A which is at least one diol having a general formula:

HO—R$_1$—OH, where R$_1$ is an aliphatic residue having 2–16 carbon atoms;

a monomeric constituent B which is at least one dicarboxylic acid having a general formula:

HOOC—R$_2$—COOH, where R$_2$ is an aliphatic residue having 1–14 carbon atoms; and a monomeric constituent C which is at least one diamine having a general formula:

$H_2N-R_3-NH_2$, where $R_3$ is an aliphatic residue having 2–16 carbon atoms and is present in an amount of up to about 5% by weight based on total weight of the monomeric constituents, wherein polycondensation proceeds in the presence of a catalyst comprised of constituent D, which is a metal-containing catalyst, in combination with constituent E, which is at least one of an organic phosphorus compound and an inorganic phosphorus compound, and wherein the ternary polycondensation product is subsequently treated with constituent F, a multivalent isocyanate compound, at a temperature reduced to about 150° C. or less for a maximum of 10 minutes so that the aliphatic polyester amide has chain terminations which are partially isocyanate-terminated and so that the ternary polycondensation product has a viscosity of at least 50,000 cPs as measured by an automatic Ubbelohde Viskosimeter in xylene at 25° C.

2. The aliphatic polyester amide according to claim 1, wherein $R_1$ is an aliphatic residue having 4–12 carbon atoms, wherein $R_2$ is an aliphatic residue having 2–8 carbon atoms, and wherein $R_3$ is an aliphatic residue having 4–8 carbon atoms.

3. The aliphatic polyester amide according to claim 1, wherein constituent A is an aliphatic diol having 4 to 6 carbon atoms.

4. The aliphatic polyester amide according to claim 1, wherein constituent A is an aliphatic diol selected from the group consisting of 1,4-butane diol and 1,6-hexane diol.

5. The aliphatic polyester amide according to claim 1, wherein constituent B is an aliphatic dicarboxylic acid having 3 to 8 carbon atoms.

6. The aliphatic polyester amide according to claim 1, wherein constituent B is an aliphatic dicarboxylic acid having 4 to 6 carbon atoms.

7. The aliphatic polyester amide according to claim 1, wherein constituent B is an aliphatic dicarboxylic acid and is adipic acid.

8. The aliphatic polyester amide according to claim 1, wherein constituent C is an aliphatic diamine and is hexamethylenediamine.

9. The aliphatic polyester amide according to claim 1, wherein constituent D is at least one inorganic tin (II) compound.

10. The aliphatic polyester amide according to claim 1, wherein constituent D is tin (II) oxide.

11. The aliphatic polyester amide according to claim 1, wherein constituent E is at least one of an inorganic phosphorus (III) compound and an organic phosphorus (III) compound.

12. The aliphatic polyester amide according to claim 1, wherein constituent E is at least one tin (II)-phosphite.

13. The aliphatic polyester amide according to claim 1, wherein constituent F is a diisocyanate.

14. The aliphatic polyester amide according to claim 1, wherein constituent F is hexamethylenediisocyanate.

15. A method for the production of an aliphatic polyester amide which is hydrolysis-resistant according to claim 1, comprising:

polycondensing monomeric constituents A, B, and C at a temperature ranging up to 230° C., in the presence of a catalyst comprised of the combination of constituents D and E, and under at least one of an inert gas and a vacuum to provide a ternary polycondensation product;

distilling off water produced during the polycondensation;

subsequently treating the ternary polycondensation product with constituent F under atmospheric pressure and at a reduced temperature for a maximum of 10 minutes to provide a hot melt;

cooling the hot melt rapidly in cold water to provide the aliphatic polyester amide; and comminuting the aliphatic polyester amide to provide at least one of a granulate and a powder thereof.

16. The method according to claim 15, wherein polycondensing monomeric constituents A, B, and C takes place at a temperature ranging from 100 to 210° C.

17. A process of providing a hot-melt adhesive, comprising:

producing an aliphatic polyester amide which is hydrolysis-resistant according to claim 1;

heating the aliphatic polyester amide to provide a melt; and applying the melt to at least one surface.

18. The process according to claim 17, wherein the at least one surface is at least one portion of a shoe.

* * * * *